(12) United States Patent
Shih et al.

(10) Patent No.: US 7,669,289 B2
(45) Date of Patent: Mar. 2, 2010

(54) DUAL-AXIS HINGE

(75) Inventors: Chin-Chung Shih, Taoyuan Hsien (TW); Yi-Shen Wang, Taoyuan Hsien (TW); Ching-Shih Chen, Taoyuan Hsien (TW); Yun-Long Tun, Taoyuan Hsien (TW); Ming-San Huang, Taoyuan Hsien (TW); John C. Wang, Taoyuan Hsien (TW)

(73) Assignee: HTC Corporation, Taoyuan County (TW)

( * ) Notice: Subject to any disclaimer, the term of this patent is extended or adjusted under 35 U.S.C. 154(b) by 272 days.

(21) Appl. No.: 11/470,665

(22) Filed: Sep. 7, 2006

(65) Prior Publication Data
US 2007/0050946 A1     Mar. 8, 2007

(30) Foreign Application Priority Data
Sep. 8, 2005    (TW) .............................. 94130924 A (51) Int. Cl.
*E05D 3/10*    (2006.01)
(52) U.S. Cl. .............................. 16/367; 16/366; 16/386; 361/679.07
(58) Field of Classification Search ................ 16/367, 16/302, 287, 366, 254, 270, 386; 455/575.3; 379/433.11, 433.12, 433.13; 361/679.06, 361/679.07, 679.11, 679.12, 679.15, 679.16, 361/679.2, 679.27, 679.28
See application file for complete search history.

(56) References Cited

U.S. PATENT DOCUMENTS

| 6,616,467 | B2 * | 9/2003 | Ibaraki et al. ............... 439/165 |
| 6,728,557 | B1 | 4/2004 | Tracy et al. |
| 6,742,221 | B2 * | 6/2004 | Lu et al. ...................... 16/367 |
| 6,845,546 | B1 * | 1/2005 | Lu et al. ...................... 16/367 |
| 7,024,729 | B2 * | 4/2006 | Chang et al. ................ 16/367 |
| 7,319,749 | B2 * | 1/2008 | Lu et al. ............... 379/433.13 |
| 7,380,314 | B2 * | 6/2008 | Hung .......................... 16/367 |
| 7,515,707 | B2 * | 4/2009 | Ka et al. ............... 379/433.12 |
| 2004/0127266 | A1 | 7/2004 | Aagaard et al. |
| 2004/0139579 | A1 * | 7/2004 | Su .............................. 16/351 |
| 2004/0192422 | A1 * | 9/2004 | Watanabe et al. ......... 455/575.3 |
| 2005/0245294 | A1 * | 11/2005 | Gupte et al. ............. 455/575.1 |
| 2005/0245296 | A1 * | 11/2005 | Hong et al. ............. 455/575.3 |
| 2006/0037175 | A1 * | 2/2006 | Hyun .......................... 16/221 |
| 2006/0048338 | A1 * | 3/2006 | Lowry et al. ................. 16/367 |
| 2006/0112519 | A1 * | 6/2006 | Harmon et al. .............. 16/367 |
| 2006/0185123 | A1 * | 8/2006 | Kuramochi .................. 16/221 |

* cited by examiner

*Primary Examiner*—Victor Batson
*Assistant Examiner*—Jeffrey O'Brien (57) ABSTRACT

A dual-axis hinge includes at least a connecting section, an upper hinge and a lower hinge. The connecting section has two sides orthogonally connected to the upper and lower hinges respectively. The connecting section has a circuit cavity that communicates with circuit outlets of the upper and lower hinges to form a passage for accommodating a transmission circuit. The upper hinge is connected to a first sleeve for joining the top cover of a folding electronic product, and the lower hinge is connected to a second sleeve for joining the body of the folding electronic product. These connections enable the top cover to rotate in at least two different directions.

15 Claims, 10 Drawing Sheets

DUAL-AXIS HINGE

RELATED APPLICATIONS

The present application is based on, and claims priority from, Taiwan Application Serial Number 94130924, filed Sep. 8, 2005, the disclosure of which is hereby incorporated by reference herein in its entirety.

BACKGROUND

1. Field of Invention

The present invention relates generally to a dual-axis hinge, and more particularly to a dual-axis hinge with bi-directional rotatability.

2. Description of Related Art

People use numerous kinds of portable electronic devices in their daily lives, such as pagers, cellular phones, and personal digital assistants (PDAs). These devices bring great convenience for people, so manufacturers make every endeavor to design more user-friendly products in order to meet the demand of consumers.

One major improvement is the design of a foldable device. There are two advantages to this design. First, the amount of information displayed at a time increases because the size of the screen can be made larger; second, the operation interface can contain more functions because the arrangement of the interface can be made diversified. The foldable device includes three parts, i.e. an upper cover, a body and a hinge module coupled between the upper cover and the body. In general, this kind of foldable structure can only be opened and closed in one direction, which may limit the practical use of the foldable device. Furthermore, the screen, in order to match the cover and body, must be shaped like a rectangle and oriented in only one direction, which is not convenient for users to read documents or websites that are oriented otherwise.

The new designs provide different operating modes, in which the upper cover can open and close in two orthogonal directions selectively, making the screen presented in either portrait or landscape modes to fit the visual demand.

Figure 1:
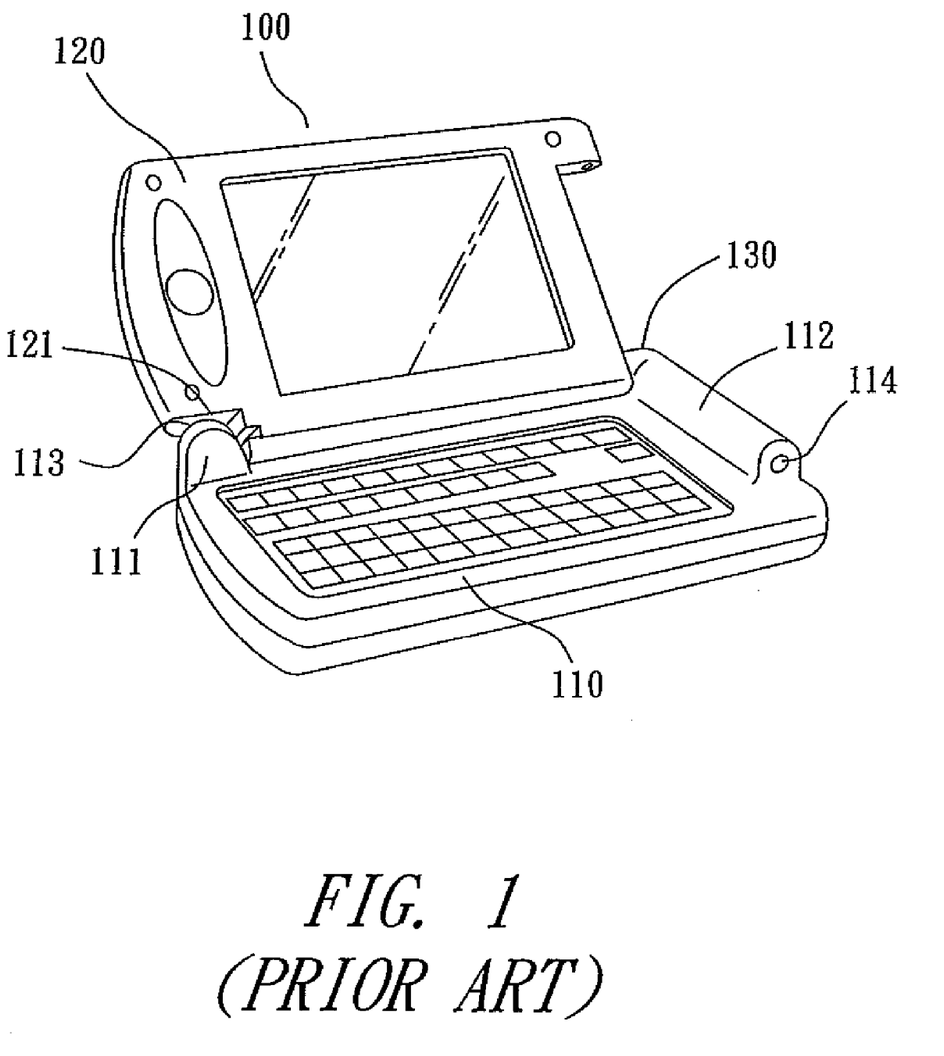
FIG. 1 illustrates a conventional dual-axis hinge applied to a foldable device.
Figure 2:
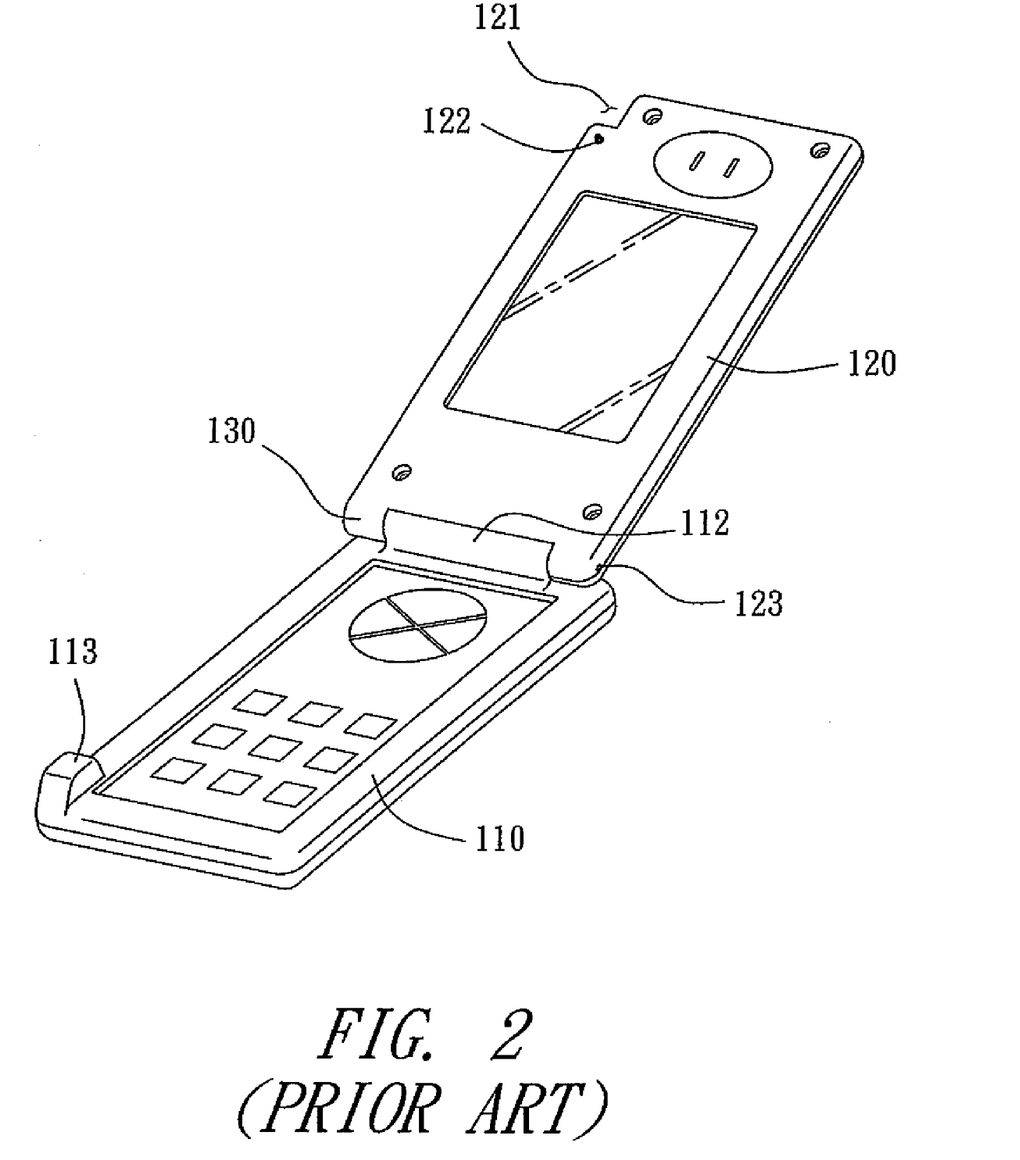
FIG. 2 illustrates a conventional dual-axis hinge applied to a foldable cellular phone.

FIGS. 1 and 2 show a conventional portable electronic device 100, which can open and close in two orthogonal directions selectively. The portable electronic device 100 includes a body 110, an upper cover 120 and a hinge 130.

FIG. 1 shows the upper cover 120 of the portable electronic device 100 opened in landscape mode. In the landscape mode, the upper cover 120 is attached to an embedded structure 111 by an indentation 121, and positioned by a lock member 113 so as to prevent the upper cover 120 from being detached from the body 110 and to make the electronic device 100 fold up smoothly.

FIG. 2 shows the upper cover 120 of the portable electronic device 100 opened in portrait mode. When the upper cover 120 is closed to the body 110, the lock member 113 is pushed first to release its lock in the lock hole 122, and then the upper cover 120 can be opened as shown in FIG. 2. When the upper cover 120 is opened, the lock member 123 positions in the lock hole 114 (shown in FIG. 1) of the raised base 112, preventing the upper cover 120 from being detached from the body 110 and making the electronic device 100 fold up smoothly.

However, there are some disadvantages in the known portable electronic device. For example, 1. Since the hinge 130 is a right angle hinge on the top surface of the body 110, the upper cover 120 and the body 110 must be designed to have some corresponding indentations and raised parts. These parts may degrade the appearance of the expensive electronic product and therefore make it look cheap.

2. Regarding general operating habits of users or long-term service products, the raised parts are easily damaged by impacts and also affect the convenience of input by interfering with handling postures of users.

SUMMARY

It is therefore an objective of the present invention to provide a bi-directional and dual-axis hinge. When the dual-axis hinge is applied to a portable electronic product, the upper cover and the body are foldable in at least two directions and have no additional indentations and raised parts formed thereon. When the upper cover is opened normally, the appearance of the upper cover and the body is smooth thereby effectively improving the aesthetic design and increasing the value of the electronic products.

It is another objective of the present invention to provide a dual-axis hinge which makes portable electronic products have a smooth appearance without raised parts, so as to avoid collision and damage and improve handling and input behaviors for the portable electronic products.

It is still another objective of the present invention to provide a dual-axis hinge, which has a transmission circuit hidden therein for connecting with the circuits of the upper cover and the body of the portable electronic product, thereby avoiding exposing the transmission circuit and thus reducing malfunction probability resulting from external forces.

According to the aforementioned objectives of the present invention, a new dual-axis hinge is provided. In one embodiment of the present invention, the dual-axis hinge utilizes a connecting section to connect an upper hinge and a lower hinge, such that the upper hinge and the lower hinge are orthogonal to each other and respectively locate at two parallels that are perpendicular to the connecting section. The upper hinge and the lower hinge are respectively connected to the upper cover and the body such that the upper cover can be foldable around an axis defined by the upper hinge and foldable around an axis defined by the lower hinge.

The structure of the dual-axis hinge of the present invention is constructed by two components, which define a circuit cavity for containing the transmission circuit. The two components are combined together by a connecting structure, and concave ring portions of the upper hinge and the lower hinge respectively have circuit outlets for the transmission circuit to pass through. In addition, two ends of the transmission circuit loops around the concave ring portions and then connect with the upper cover and the body respectively. The transmission circuit is hidden inside the dual-axis hinge, thereby reducing the damage and breakage of the transmission circuit when the upper cover is folded repeatedly.

It is to be understood that both the foregoing general description and the following detailed description are by examples and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Figure 3:
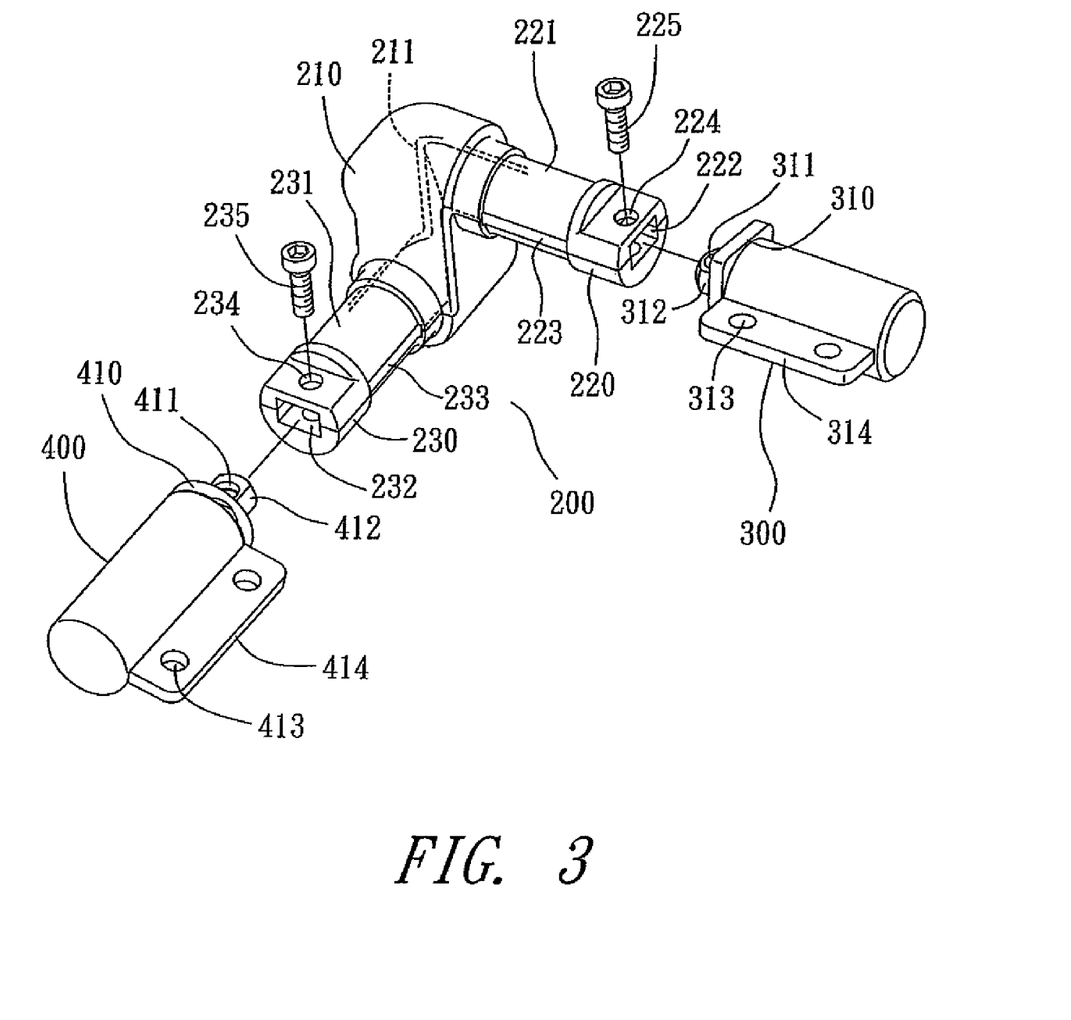
FIG. 3 shows an exploded view of a dual-axis hinge according to a preferred embodiment of the present invention.

FIG. 3 illustrates a dual-axis hinge 200 of the preferred embodiment of the present invention. The dual-axis hinge 200 includes a connecting section 210, an upper hinge 220, a lower hinge 230, a first sleeve 300, and a second sleeve 400.

The upper end and the lower end of the connecting section 210 orthogonally connect the upper hinge 220 and the lower hinge 230 respectively, and the upper hinge 220 and the lower hinge 230 are orthogonal to each other.

The upper hinge 220 has a concave ring portion 221 and a connecting hole 222, and the lower hinge 230 has a concave ring portion 231 and a connecting hole 232. The concave ring portions 221 and 231 have corresponding circuit outlets 223 and 233, respectively. A circuit cavity 211 is formed within the connecting section 210 and communicates with the outlets 223 and 233. Moreover, the upper hinge 220 and the lower hinge 230 have through-holes 224 and 234 respectively formed thereon and communicating with the connecting holes 222 and 232 for combining with connecting components 225 and 235, respectively.

Figure 4:
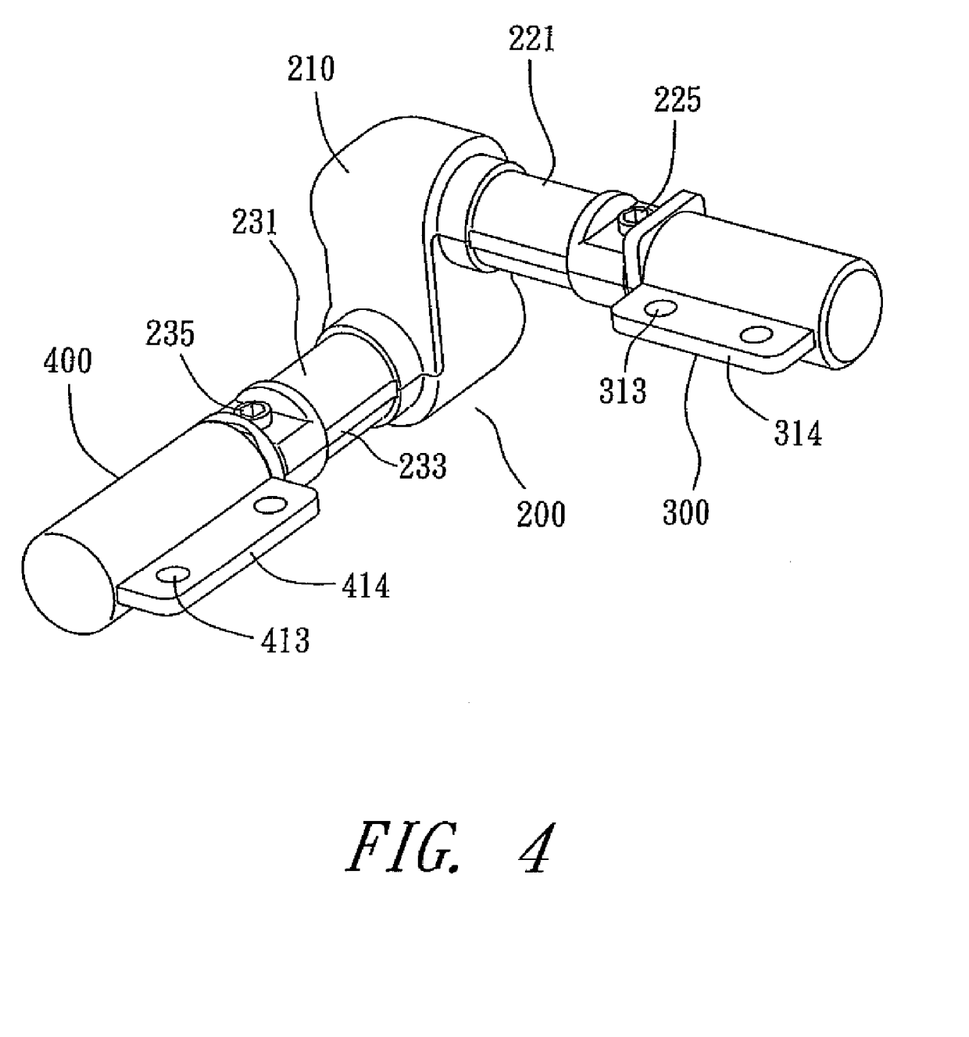
FIG. 4 shows a perspective view of a dual-axis hinge according to the preferred embodiment of the present invention.

The first sleeve 300 includes a joint rod 310, which has a protrusion 312 disposed on the front end of the joint rod 310 and a hole 311 formed on the protrusion 312. The protrusion 312 can plug into the connecting hole 222 (as shown in FIG. 4) and be positioned and fixed at the upper hinge 220 with the connecting component 225 passing through the through-holes 224 and the hole 311. Besides, the first sleeve 300 includes a flange 314, which has two holes 313 formed thereon.

The second sleeve 400 includes a joint rod 410, which has a protrusion 412 disposed on the front end of the joint rod 410 and a hole 411 formed on the protrusion 412. The protrusion 412 can plug into the connecting hole 232 (as shown in FIG. 4) and be positioned and fixed at the upper hinge 320 with the connecting component 235 passing through the through-holes 234 and the hole 411. Besides, the second sleeve 400 includes a flange 414, which has two holes 413 formed thereon.

Figure 5:
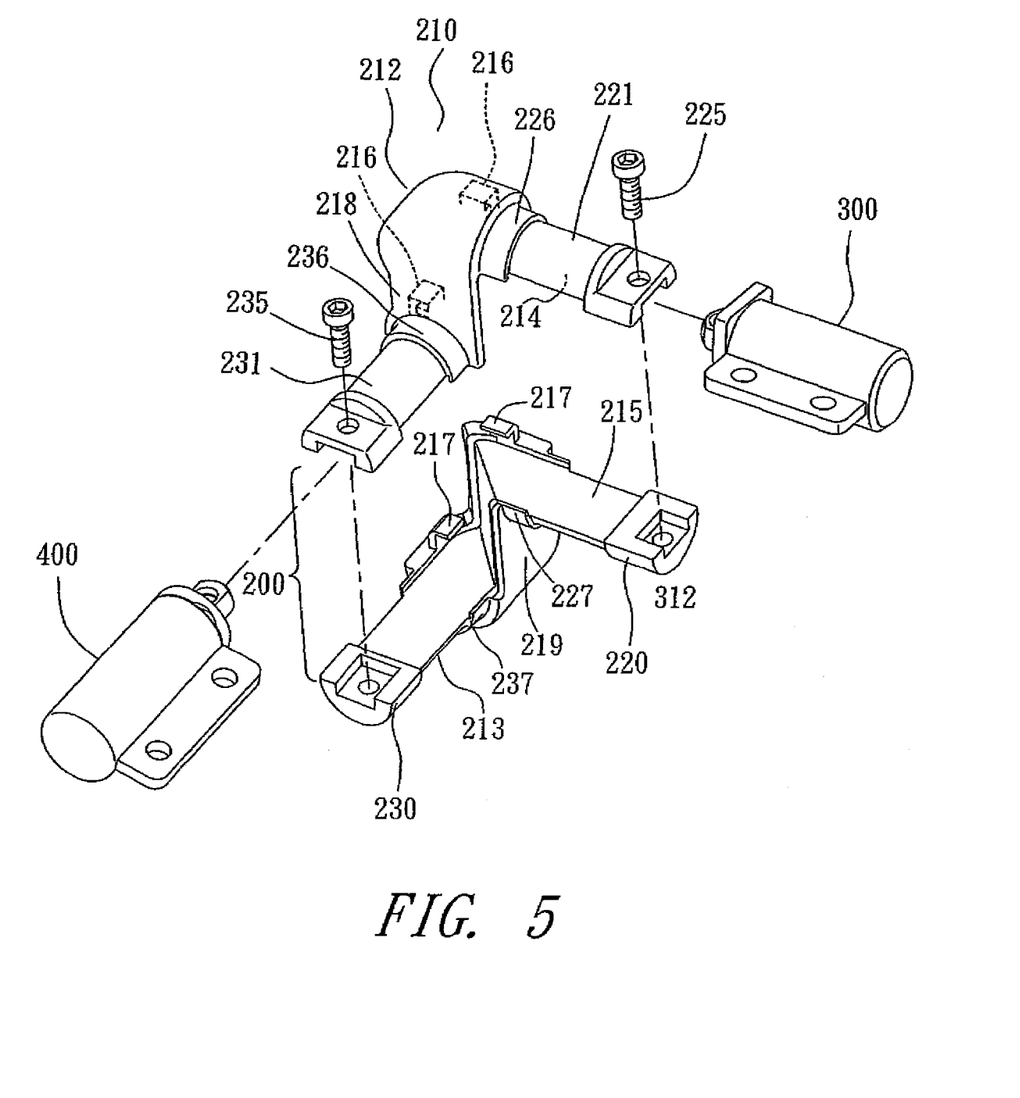
FIG. 5 shows an exploded view of a dual-axis hinge according to the preferred embodiment of the present invention.
Figure 6:
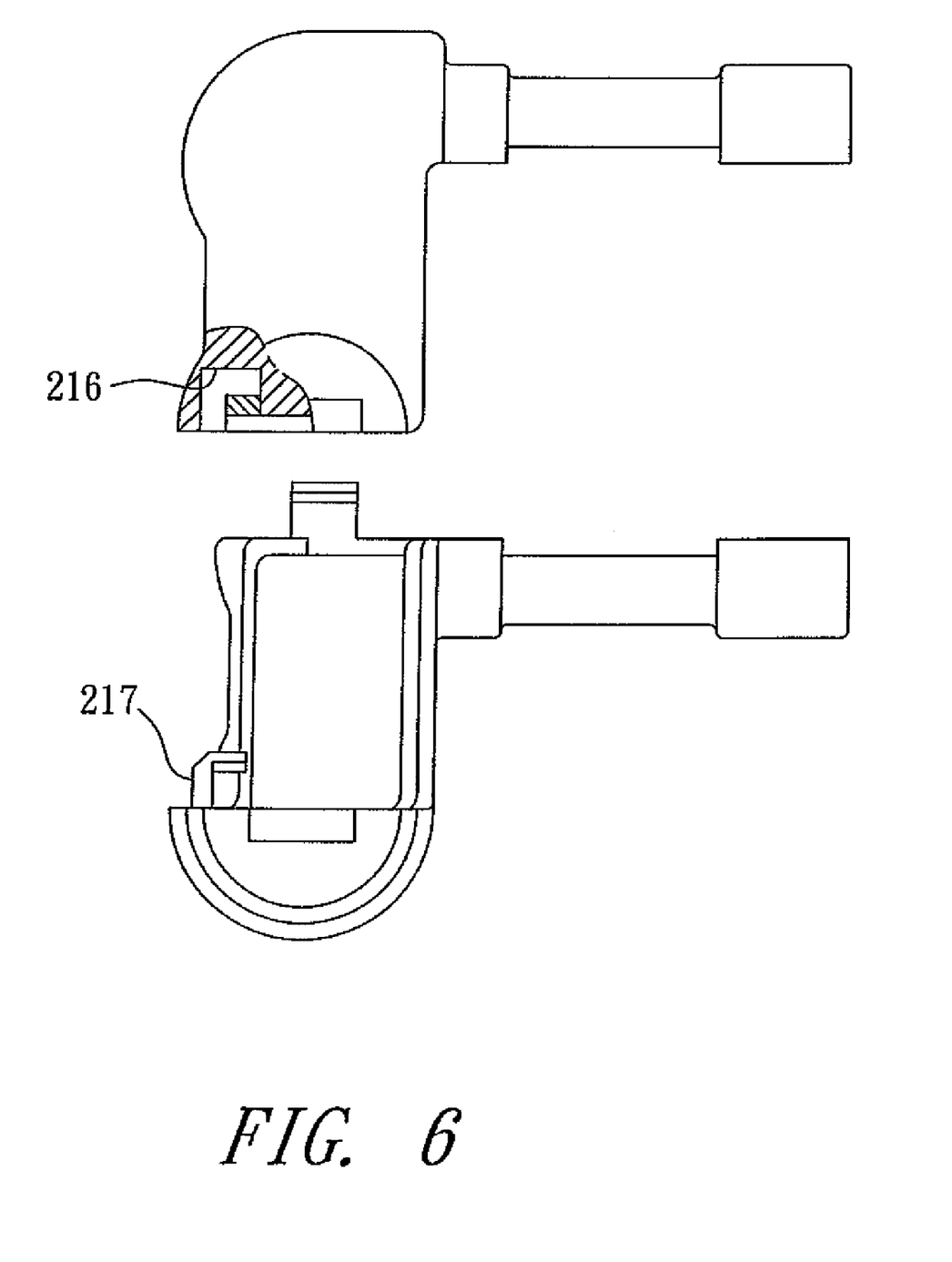
FIG. 6 shows a connecting structure of a dual-axis hinge according to the preferred embodiment of the present invention.

Referring to FIG. 5, the body formed by the connecting section 210, the upper hinge 220 and the lower hinge 230 is split into an upper component 212 and a lower component 213. The upper component 212 includes a top connecting portion 218, a first top hinge portion 226 and a second top hinge portion 236; and the lower component 213 includes a bottom connecting portion 219, a first bottom hinge portion 227 and a second bottom hinge portion 237. When the upper component 212 is coupled to the lower component 213, the first top hinge portion 226 and the first bottom hinge portion 227 are combined together to form the upper hinge 220, and the second top hinge portion 236 and the second bottom hinge portion 237 are combined together to form the lower hinge 230. The upper component 212 and the lower component 213 respectively have an upper groove 214 and a lower groove 215 formed on the split section of the connecting section 210 and the concave ring portions 221 and 231. Further, the upper component 212 and the lower component 213 respectively have connecting slots 216 and connecting hooks 217, which form the connecting structure for connecting the upper component 212 and the lower component 213 (as shown in FIG. 6). The space formed by the upper groove 214 and the lower groove 215 is the circuit cavity 211, through which a transmission circuit 500 passes (as shown in FIG. 7).

Figure 7:
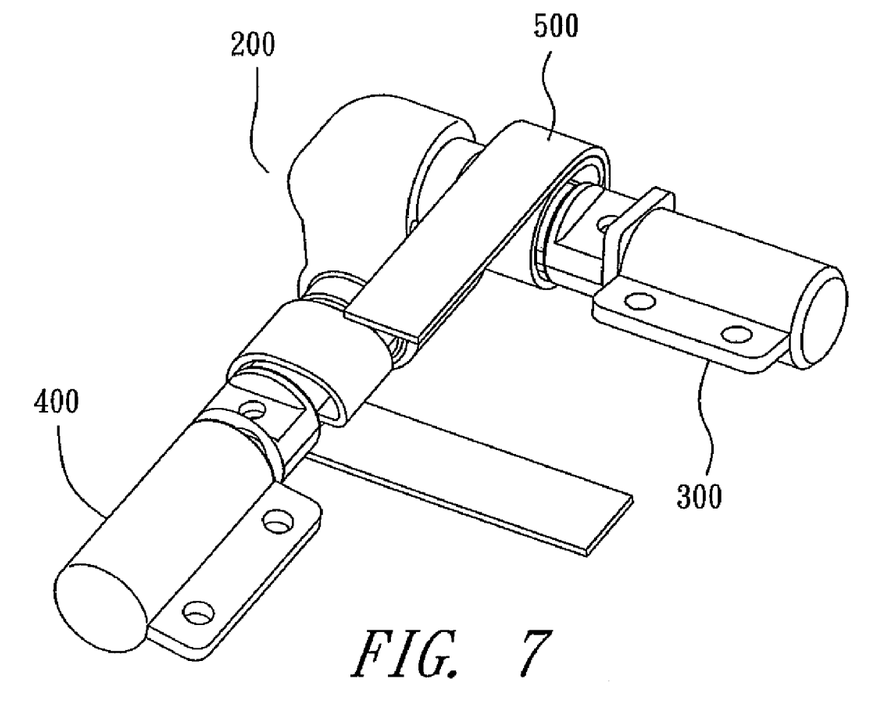
FIG. 7 depicts a perspective view of the transmission circuit looping around the dual-axis hinge according to the preferred embodiment of the present invention.
Figure 8:
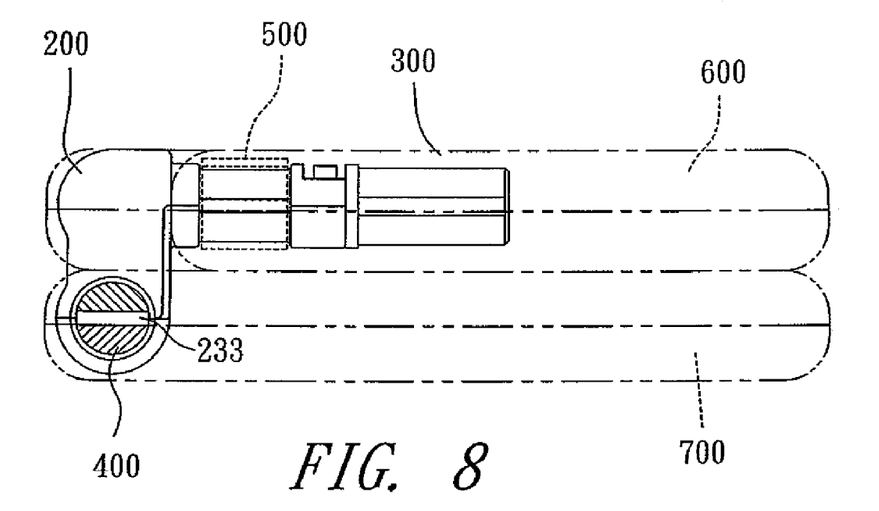
FIG. 8 shows a cross-sectional view of a foldable device, which includes the dual-axis hinge and the transmission circuit of the preferred embodiment of the present invention.

Referring to FIG. 7, the transmission circuit 500 passes through the circuit cavity 211, wherein two ends of the transmission circuit 500 respectively pass through the circuit outlets 223 and 233, loop around the concave ring portions 221 and 231, and then connect with an upper cover 600 and a body 700 of a foldable device, e.g. a portable electronic product, so that the circuit between the upper cover 600 and the body 700 is connected (as shown in FIG. 8). In this embodiment, the transmission circuit 500 may be implemented by an electric wire, a flat cable or a flexible circuit board.

Figure 9:
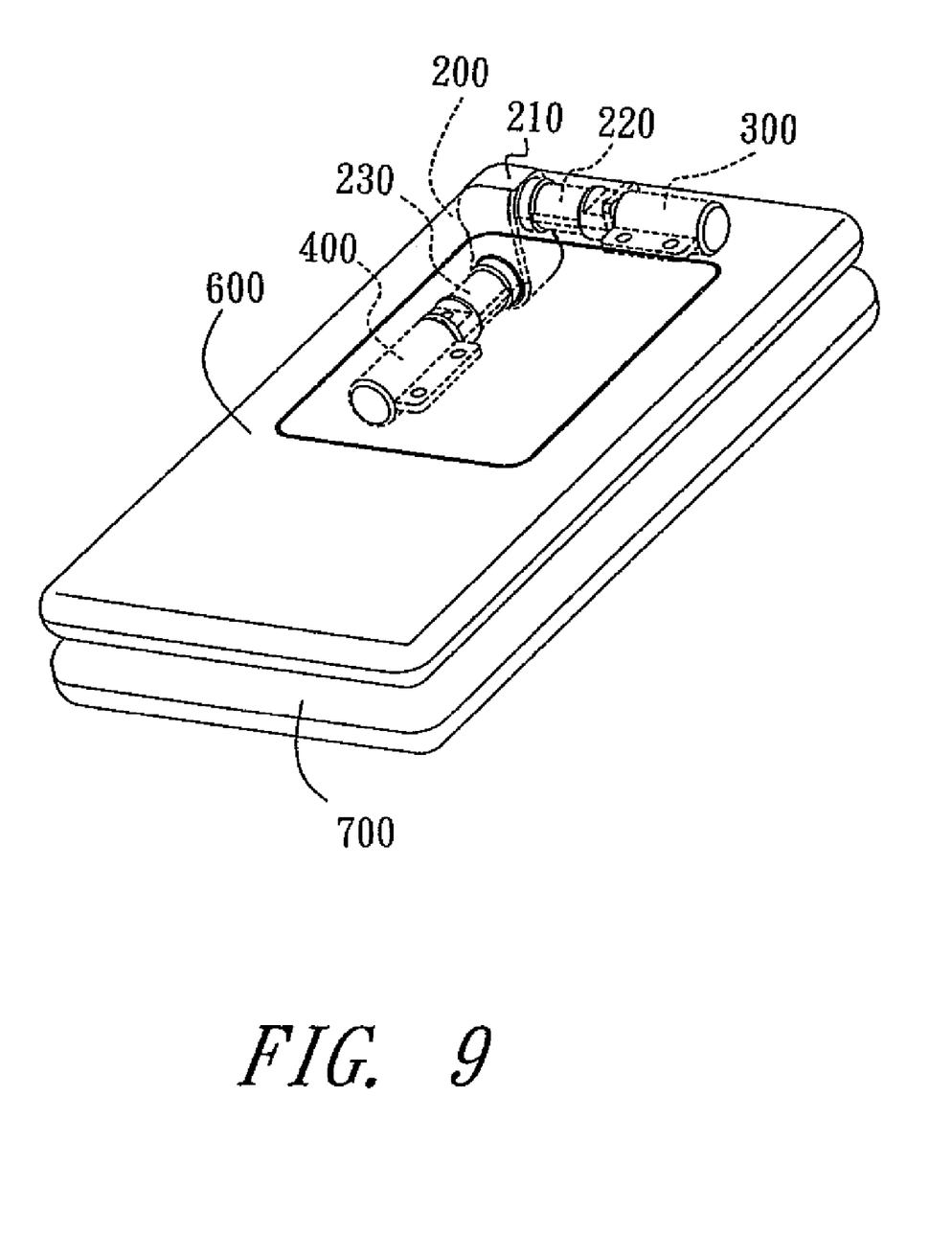
FIG. 9 shows a perspective view of a foldable device, which includes the dual-axis hinge and the transmission circuit of the preferred embodiment of the present invention.
Figure 10:
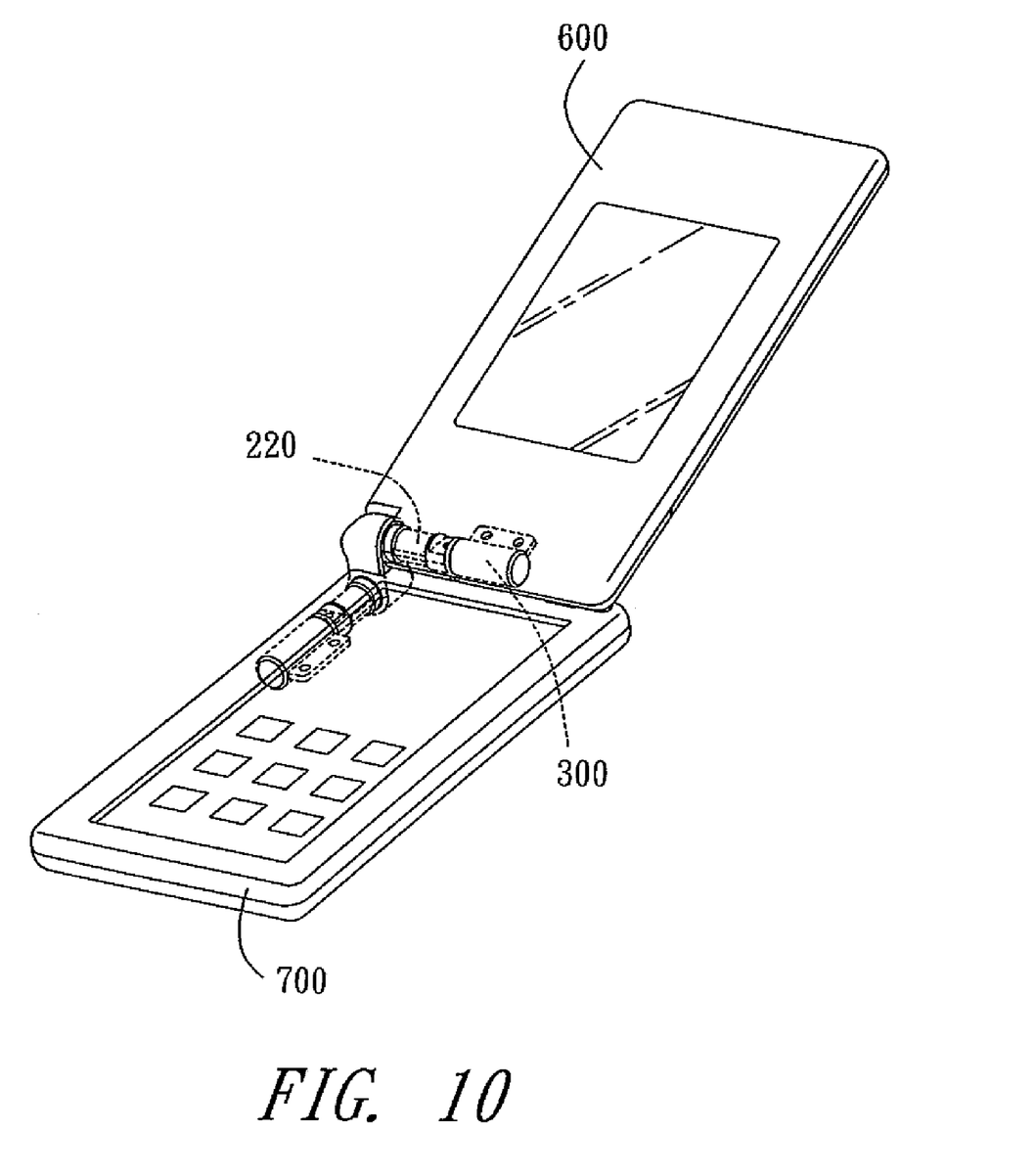
FIG. 10 illustrates a portable electronic device, in which the upper cover opens in portrait mode; and, FIG. 11 illustrates a portable electronic device, in which the upper cover opens in landscape mode.

Referring to FIG. 9, the upper cover 600 and the body 700 respectively have an indentation at corresponding corners, and the indentation is fitted to be coupled with the connecting section 210. The lower hinge 230 and the second sleeve 400 are configured in the interior of body 700, and the upper hinge 220 and the first sleeve 300 are configured in the interior of upper cover 600. The upper cover 600 may rotate around an axis defined by the upper hinge 220 and the first sleeve 300 such that the foldable device can be open in portrait mode as shown in FIG. 10.

Figure 11:
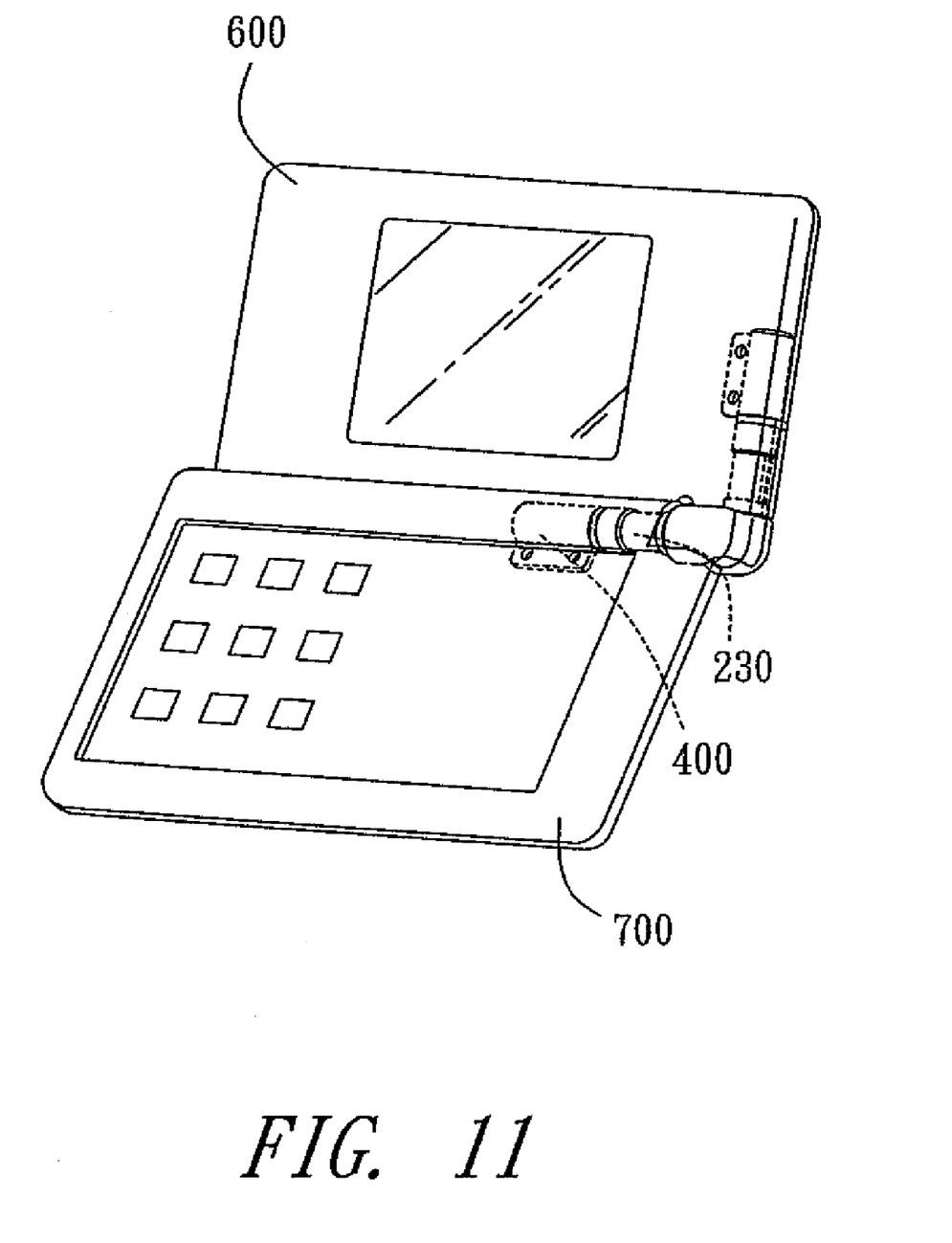

In order to open the foldable device in another direction, the upper cover 600 should be closed to the body 700 as shown in FIG. 9; then, the upper cover 600 can rotate around another axis defined by the lower hinge 230 and the second sleeve 400 such that the foldable device can be open in landscape mode as shown in FIG. 11.

According to the aforementioned composition and embodiments, the present invention provides many advantages over the prior art, for example:

1. The upper hinge and the lower hinge of the dual-axis hinge according to the present invention are respectively disposed at an upper plane and a lower plane and orthogonal to each other by respectively connecting to two sides of the perpendicular connecting section. Therefore, the body and the upper cover of the portable electronic device (such as a cellular phone, PDA, etc.) have no raised parts formed thereon such that the appearance of the portable electronic device can be smoother and thus increase the competitiveness and value.

2. Utilizing the structure of the bi-directional and dual-axis hinge, the portable electronic device only needs an indentation at the corresponding corners of the body and the upper cover for coupling the dual-axis hinge such that the installation, molding, manufacture, or fabrication of the body and the upper cover are much easier without adding unnecessary fabricating cost.

3. The entire electronic product has no any raised part, thereby avoiding damage of raised parts in long-term operation and thus removing operation inconvenience from consumers.

4. The dual-axis hinge has the circuit cavity for the transmission circuit to pass through and the concave ring portions for the transmission circuit to loop around, such that when the transmission circuit connects with the body and the upper cover, it is not only hidden but also able to increase space to move, granting the electronic products more durability and avoiding wear and breakage in long-term operation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dual-axis hinge connected to a body and an upper cover for a portable electronic device, the dual-axis hinge comprising:
   a connecting section having an upper end and a lower end;
   an upper hinge, and a first sleeve connected to the upper hinge, entirely embedded within the upper cover, wherein the upper hinge is fixed to the upper end of the connecting section;
   a lower hinge, and a second sleeve connected to the lower hinge, entirely embedded within the body, wherein the lower hinge is fixed to the lower end of the connecting section, and
   connecting components for connecting the first sleeve and the second sleeve to the upper hinge and the lower hinge, respectively;
   wherein the upper end of the connecting section is fixed to one end of the upper hinge and the lower end of the connecting section is fixed to one end of the lower hinge, the lower hinge and the upper hinge are always orthogonal to each other, the lower hinge and the upper hinge are always orthogonal to the connecting section, and the lower hinge and the upper hinge are respectively located in two parallel planes which are perpendicular to the connecting section, and the body and the upper cover have no raised part for use with the dual-axis hinge.

2. The dual-axis hinge of claim 1, wherein the connecting section has a circuit cavity, and each of the upper hinge and the lower hinge has a circuit outlet for communicating with the circuit cavity.

3. The dual-axis hinge of claim 2, wherein each of the upper hinge and the lower hinge further has a concave ring portion, and the circuit outlet is disposed on the concave ring portion.

4. The dual-axis hinge of claim 1, wherein each of the upper hinge and the lower hinge has a connecting hole, each of the first sleeve and the second sleeve has a joint rod and a protrusion disposed on the joint rod, each of the protrusions has a hole, and the protrusions respectively plug into the connecting holes of the upper hinge and the lower hinge, and the connecting components respectively pass through the holes of the protrusions to connect the protrusions of the first sleeve and the second sleeve to the connecting holes of the upper hinge and the lower hinge.

5. The dual-axis hinge of claim 1, wherein each of the first sleeve and the second sleeve comprises a flange having at least one assembling hole disposed thereon.

6. A portable electronic device, comprising:
   a body;
   an upper cover coupled to the body; and
   a dual-axis hinge for coupling the body to the upper cover, the dual-axis hinge including:
   a connecting section having an upper end and a lower end;
   an upper hinge, and a first sleeve connected to the upper hinge, entirely embedded within the upper cover, wherein the upper hinge is fixed to the upper end of the connecting section;
   a lower hinge, and a second sleeve connected to the lower hinge, entirely embedded within the body, wherein the lower hinge is fixed to the lower end of the connecting section; and
   connecting components for connecting the first sleeve and the second sleeve to the upper hinge and the lower hinge, respectively;
   wherein the upper end of the connecting section is fixed to one end of the upper hinge and the lower end of the connecting section is fixed to one end of the lower hinge, the lower hinge and the upper hinge are always orthogonal to each other, the lower hinge and the upper hinge are always orthogonal to the connecting section, and the lower hinge and the upper hinge are respectively located in two parallel planes which are perpendicular to the connecting section, and the body and the upper cover have no raised part for use with the dual-axis hinge.

7. The portable electronic device of claim 6, wherein the connecting section has a circuit cavity, and each of the upper hinge and the lower hinge has a circuit outlet for communicating with the circuit cavity.

8. The portable electronic device of claim 7, wherein each of the upper hinge and the lower hinge further has a concave ring portion, and the circuit outlet is disposed on the concave ring portion.

9. The portable electronic device of claim 6, wherein each of the upper hinge and the lower hinge has a connecting hole, each of the first sleeve and the second sleeve has a joint rod and a protrusion disposed on the joint rod, each of the protrusions has a hole, and the protrusions respectively plug into the connecting holes of the upper hinge and the lower hinge, and the connecting components respectively pass through the holes of the protrusions to connect the protrusions of the first sleeve and the second sleeve to the connecting holes of the upper hinge and the lower hinge.

10. The portable electronic device of claim 6, wherein each of the first sleeve and the second sleeve comprises a flange having at least one assembling hole disposed thereon.

11. A dual-axis hinge connected to a body and an upper cover for a portable electronic device, the dual-axis hinge comprising:

an upper component having a first top hinge portion, a second top hinge portion, a top connecting portion between the first top hinge portion and the second top hinge portion, and an upper groove;

a lower component having a first bottom hinge portion, a second bottom hinge portion, a bottom connecting portion between the first bottom hinge portion and the second bottom hinge portion, and a lower groove; and a connecting structure for connecting the upper component and the lower component;

wherein when the upper component and the lower component are combined together, the upper groove and the lower groove form a circuit cavity, the top connecting portion and the bottom connecting portion construct a connecting section, the first top hinge portion and the first bottom hinge portion construct a first hinge, the second top hinge portion and the second bottom hinge portion construct a second hinge, each of the first hinge and the second hinge has a circuit outlet for communicating with the circuit cavity, the first hinge and the second hinge are always orthogonal to each other, the first hinge and the second hinge are always orthogonal to the connecting section, and the first hinge and the second hinge are respectively located in two parallel planes which are perpendicular to the connecting section, wherein the dual-axis hinge further comprises:

a first sleeve and a second sleeve respectively connected to the first hinge and the second hinge; and connecting components for connecting the first sleeve and the second sleeve to the first hinge and the second hinge, respectively;

wherein the first hinge and the first sleeve are entirely embedded within the upper cover, the second hinge and the second sleeve are entirely embedded within the body, and the body and the upper cover have no raised part for use with the dual-axis hinge.

12. The dual-axis hinge of claim 11, wherein the connecting structure comprises a connecting slot and a connecting hook.

13. The dual-axis hinge of claim 11, wherein each of the first hinge and the second hinge further has a concave ring portion, and the circuit outlet is disposed on the concave ring portion.

14. The dual-axis hinge of claim 11, wherein each of the first hinge and the second hinge has a connecting hole, each of the first sleeve and the second sleeve has a joint rod and a protrusion disposed on the joint rod, each of the protrusions has a hole, and the protrusions respectively plug into the connecting holes of the first hinge and the second hinge, and the connecting components respectively pass through the holes of the protrusions to connect the protrusions of the first sleeve and the second sleeve to the connecting holes of the first hinge and the second hinge.

15. The dual-axis hinge of claim 14, wherein each of the first sleeve and the second sleeve further comprises a flange having at least one assembling hole disposed thereon.

\* \* \* \* \*